O. M. KEITH & E. L. EARLY.
LAWN MOWER.
APPLICATION FILED JAN. 13, 1908.

907,371.

Patented Dec. 22, 1908.

2 SHEETS—SHEET 1.

Witnesses.
R. H. Decker
S. F. Christy.

Inventors.
O. M. Keith and E. L. Early.
by Orwig & Lane Atty's.

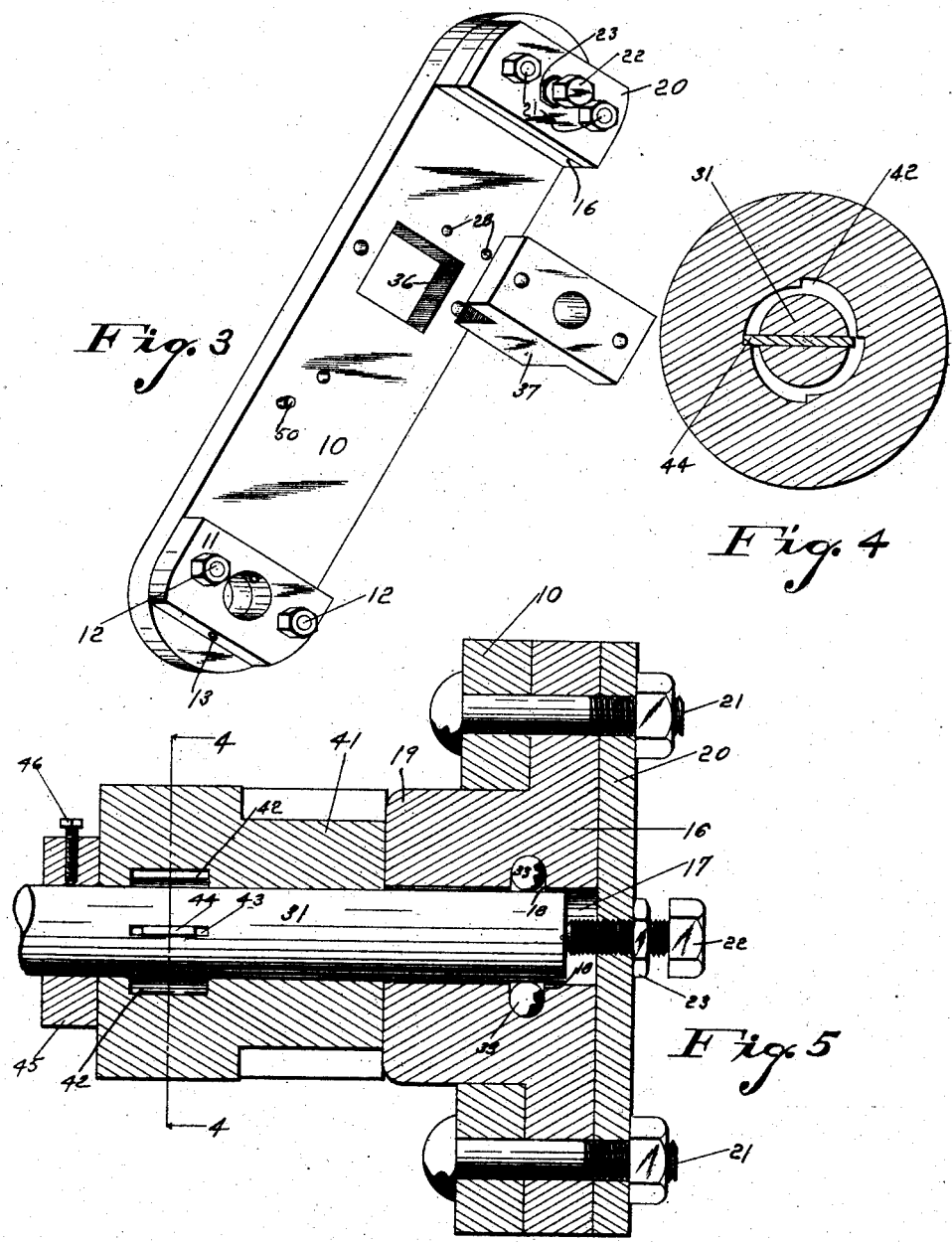

UNITED STATES PATENT OFFICE.

OSCAR M. KEITH AND EARNEST L. EARLY, OF NEWTON, IOWA.

LAWN-MOWER.

No. 907,371.  Specification of Letters Patent.  Patented Dec. 22, 1908.

Application filed January 13, 1908. Serial No. 410,500.

*To all whom it may concern:*

Be it known that we, OSCAR M. KEITH and EARNEST L. EARLY, citizens of the United States, residing at Newton, in the county of Jasper and State of Iowa, have invented a new and useful Lawn-Mower, of which the following is a specification.

Our invention relates to that class of lawn mowers in which a rotary cutter operates in conjunction with a stationary cutting blade, the rotary cutter being propelled by power from a supporting wheel.

Our object is to provide a lawn mower of this class in which the body portion of the frame may be formed of sheet metal plates so arranged and combined with the rear shaft and the stationary cutting blade, as to provide a strong, durable and inexpensive frame.

A further object is to provide a device of this kind in which the cutting blades are of greater length than the distance between the outer portions of the supporting wheels, so that the supporting wheels will always travel on a path which is first traversed by the cutting blades.

A further object is to provide improved bearing devices for supporting the cutting blade, especially designed for use in connection with the sheet metal side plates of the frame.

Our invention consists in certain details in the construction, and arrangement of the various parts of the device, whereby the objects contemplated are attained, as hereinafter more fully set forth, pointed out in our claim and illustrated in the accompanying drawings, in which—

Figure 1:
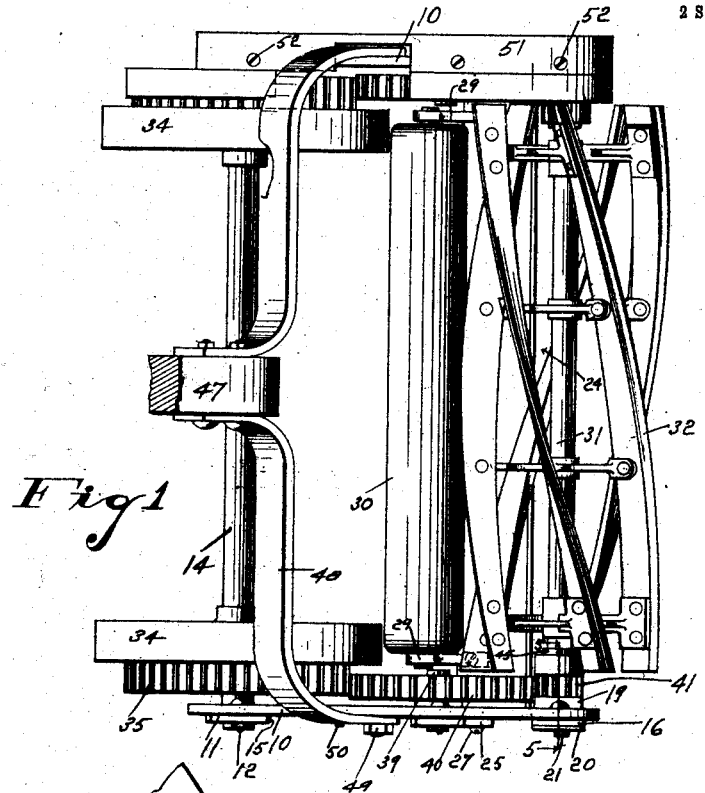
Figure 2:
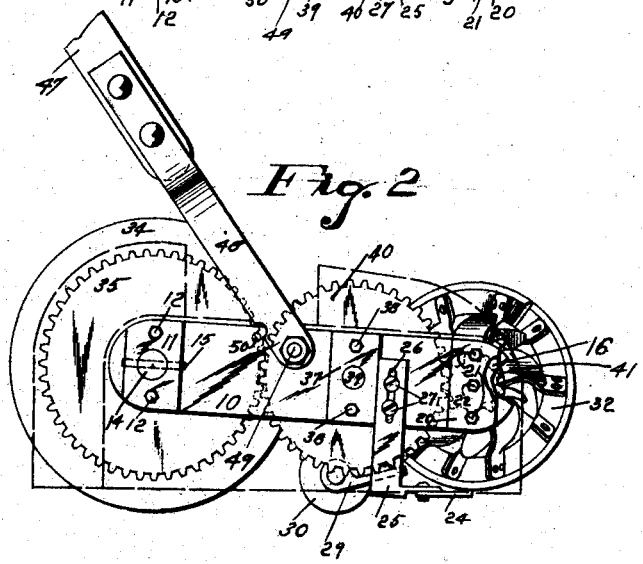

Figure 1 shows a top or plan view of a complete lawn mower embodying our invention. Fig. 2 shows a side elevation of same. Fig. 3 shows a detail perspective view of one of the side plates of the frame and the bearing devices therein, the central bearing device being detached from the plate. Fig. 4 shows a sectional view on the line 4—4 of Fig. 5, and Fig. 5 shows an enlarged detail sectional view on the line 5—5 of Fig. 1.

Referring to the accompanying drawings, we have used the reference numeral 10 to indicate the side plates of the frame. These are each made of a single piece of plate metal having openings therein to receive bearing devices hereinafter described. These plates are straight throughout their length, and can be prepared for use simply by punching out the necessary holes for bearing devices, etc. At the rear of each plate 10 is a block 11 connected to the plate by bolts 12, said block being provided with a central opening arranged in line with a similar opening in the plate 10, and it is also provided with a pin opening 13 extending transversely through it.

The rear axle is indicated by the numeral 14, and extends through the openings in the plates 10, and through the openings in the blocks 11, and the pins 15 are extended through the ends of the rear axle and through the openings 13 to thereby firmly secure the axle to the side plates.

At the front end of each side plate is a bearing block 16 having a central opening 17 and a bearing ball race-way 18 surrounding said opening. The bearing block 16 is provided with a lateral extension 19 extended through an opening formed in the plate 10. Mounted on the outer surface of the bearing block 16 is a plate 20. The said plate and the bearing block 16 are connected with each other by means of bolts 21 passing through them. Seated in the plate 20 is a set screw 22 designed to enter the opening 17 of the bearing block. A lock nut 23 is provided on said set screw to engage the outer face of the plate 20. The forward end of the frame is braced and supported by means of the stationary cutting blade 24 which has attached to its ends the brackets 25, each of said brackets being provided with a slot 26 in which the screws 27 are mounted and inserted in the openings 28 in the plate 10. By this means, the forward ends of the plates 10 are firmly supported relative to each other, and the cutting blade is adjustably fixed in position.

Connected with the cutting blade are the arms 29 in which a roller 30 is rotatably mounted, for supporting the forward portion of the lawn mower.

The rotary cutter comprises a shaft 31 and spiral cutting blades 32 of the ordinary construction, fixed to the shaft and designed to co-act with the stationary cutting blade. The ends of the shaft 31 project into the bearing blocks 16 and are engaged by the bearing balls 33 in the race-way 18. The set screw 22 is designed to engage the end of the shaft 31, and thus provides for adjusting the shaft 31 longitudinally.

By the arrangement of the bearing balls and the screw 22, the shaft 31 may be prevented from binding and allowed to freely rotate with a minimum of friction, and is yet held firmly in line both against longitudinal movement, and against vertical movement, the latter being effected by the pointed ends of the screw 22 entering the corresponding notch in the end of the shaft 31. This feature is illustrated in Fig. 5 by a dotted line.

We have provided for imparting motion to the rotary cutter as follows: Rotatably mounted upon the rear axle 14 are the supporting wheels 34. Each has on its outer surface a gear 35. Near the central portion of each of the side plates 10, we have formed a rectangular opening 36, and in this opening is placed a bearing block 37 detachably held to the plate 10 by means of the bolts 38. In the bearing block 37 is mounted a short shaft 39, and on the shaft 39 is a pinion 40, in mesh with the pinion 35. Mounted upon the shaft 31 near each end, is a small pinion 41 in mesh with the pinion 40. Formed within the pinion 41 are the ratchet teeth 42. Formed in the shaft 31 adjacent to the ratchet teeth 42 is a transverse slot 43 in which a pawl 44 is slidingly mounted, said pawl being so arranged relative to the ratchet teeth 42 that the pinion 41 will always turn the shaft 31 when the lawn mower is being moved forwardly, and the shaft 31 will remain idle when the lawn mower is moved rearwardly. The pinion 41 is held in position on the shaft 31 by means of a collar 45 held to the shaft 31 by the set screw 46.

The reference numeral 47 indicates a handle for operating the lawn mower, which handle is provided with extensions 48 which are pivoted by means of the bolts 49 to the side plates 10 near their central portions. Each side plate is provided with a pin 50 designed to engage the arms 48 and limit their rearward movement so that the forward end of the lawn mower may be tilted up by pressing downwardly and rearwardly upon the handle. We have also provided a casing for the gearing devices on each side of the frame, which casing is preferably made of sheet metal and is indicated by the reference numeral 51, and is shaped to inclose said gear wheels as well as the side plates 10, and is held to said side plates by means of the screws 52. In Fig. 2 of the drawings, the shape of said casing in side elevation is indicated by dotted lines.

It is obvious that by means of the construction herein set forth, the lawn mower frame is provided of very simple, durable and inexpensive construction, in which the cutting blade is of a length to overlap the paths of the supporting wheels. Furthermore, by the arrangement of the various bearing devices upon the plates 10, said bearing devices may be quickly and easily assembled. Furthermore, the adjusting device for the shaft of the rotary cutting blades is of very simple and inexpensive construction, and will permit of very accurate adjustment without undue friction or lost motion.

Having thus described our invention, what we claim and desire to secure by Letters Patent, is—

A lawn mower comprising two straight side plates, an axle fixed to the rear ends thereof, supporting wheels mounted on said rear axle, gears fixed to said supporting wheels, detachable bearing blocks fixed to the side plates near their central portions, short shafts mounted therein, pinions on said shafts in mesh with the gears on the supporting wheels, detachable bearing blocks at the forward ends of said plates, a shaft rotatably mounted in said bearing blocks, adjustable set screws in engagement with the ends of said shaft, pinions on the end portions of said shaft, said pinions being in mesh with the pinions at the central portions of the supporting plates, a rotary cutter mounted on the said shaft, the said supporting wheels being both arranged within the path of the rotary cutter, a stationary cutter blade fixed to the forward ends of the supporting plates, means for adjusting said stationary blade vertically relative to the rotary cutter, and a handle pivoted to the sides of the supporting plates.

Des Moines, Iowa, Nov. 7, 1907.

OSCAR M. KEITH.
EARNEST L. EARLY.

Witnesses:
E. M. S. McLAUGHLIN,
W. R. COOPER.